(12) United States Patent
Heidloff et al.

(10) Patent No.: US 7,555,526 B1
(45) Date of Patent: Jun. 30, 2009

(54) ACTIONS ON AUTO-GENERATED EMAILS FROM THE INBOX

(75) Inventors: Niklas Heidloff, Salzkotten (DE);
Kristina Beckley, Carlisle, MA (US);
Stanley Kieran Jerrard-Dunne, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/172,011

(22) Filed: Jul. 11, 2008

(51) Int. Cl.
*G06F 15/16* (2006.01)
*G06F 15/173* (2006.01)

(52) U.S. Cl. .................. 709/206; 709/203; 709/224; 709/225; 709/229

(58) Field of Classification Search .................. 709/203, 709/206, 224, 225, 229
See application file for complete search history.

(56) References Cited

U.S. PATENT DOCUMENTS

| | | | |
|---|---|---|---|
| 6,654,892 B1 * | 11/2003 | Karim | 726/11 |
| 6,829,607 B1 | 12/2004 | Tafoya et al. | |
| 6,983,308 B1 | 1/2006 | Oberhaus et al. | |
| 7,054,906 B2 | 5/2006 | Levosky | |
| 2001/0016845 A1 | 8/2001 | Tribbensee | |
| 2002/0037714 A1 | 3/2002 | Takae et al. | |
| 2002/0107904 A1 | 8/2002 | Talluri et al. | |
| 2004/0019643 A1 * | 1/2004 | Zirnstein, Jr. | 709/206 |
| 2004/0254998 A1 | 12/2004 | Horvitz | |
| 2006/0143273 A1 | 6/2006 | Chao et al. | |
| 2007/0033588 A1 * | 2/2007 | Landsman | 717/178 |
| 2007/0190995 A1 | 8/2007 | Wang et al. | |
| 2008/0256206 A1 * | 10/2008 | Lee et al. | 709/206 |

FOREIGN PATENT DOCUMENTS

WO  WO 98/16894  4/1998

OTHER PUBLICATIONS

Gwizdka, J.; TaskView-Design and Evaluation of a Task-Based Email Interface, Proceedings of the IBM Centers for Advanced Studies Conference—CASCON 2002; IBM: Toronto, Canada 136-145.

* cited by examiner

*Primary Examiner*—Quang N. Nguyen
(74) *Attorney, Agent, or Firm*—Locke Lord Bissell & Liddell, LLP; Matthew T. Eggerding

(57) ABSTRACT

The example embodiments relate to a method for handling and analyzing emails. In accordance with at least one example embodiment, a control character specifying a computer application may be determined to be included in an email message. The control character in the email may be compared to a library of control characters, such that each control character in the library corresponds to a command. If the control character in the email corresponds to a control character in the library, the command associated with the character may be executed, which may display a user interface in the email program, the user interface including at least two user-selectable actions specific to the computer application. The user may select an action from the user interface, which may execute the computer application in accordance with the selected action and automatically authenticate the user onto the computer application.

1 Claim, 2 Drawing Sheets

ACTIONS ON AUTO-GENERATED EMAILS FROM THE INBOX

FIELD

The example embodiments relate to a method for handling email messages.

BACKGROUND

Email messaging is a common form of communication, especially in the workplace. Among its many uses, email may serve as a reminder of a task to be completed. Auto-generated emails may allow a user to keep track of tasks in the inbox of the email program. Thus, when a user receives an auto-generated reminder email that requires an action in another computer application, such as approving or rejecting a request, the user may click on a link in the email, follow the link to the application, authenticate into the application by entering a password, and navigate through a number of screens in the application to finally arrive at the action screen where the task can be completed. This process, especially the navigation of multiple levels of the application, is cumbersome, confusing, and time consuming.

SUMMARY

The example embodiments relate to a method for handling and analyzing emails. In accordance with at least one example embodiment, a control character specifying a computer application may be determined to be included in an email message. The control character in the email may be compared to a library of control characters, such that each control character in the library corresponds to a command. If the control character in the email corresponds to a control character in the library, the command associated with the character may be executed, which may display a user interface in the email program, the user interface including at least two user-selectable actions specific to the computer application. The user may select an action from the user interface, which may execute the computer application in accordance with the selected action and automatically authenticate the user onto the computer application.

DETAILED DISCUSSION OF EMBODIMENTS

Figure 1:
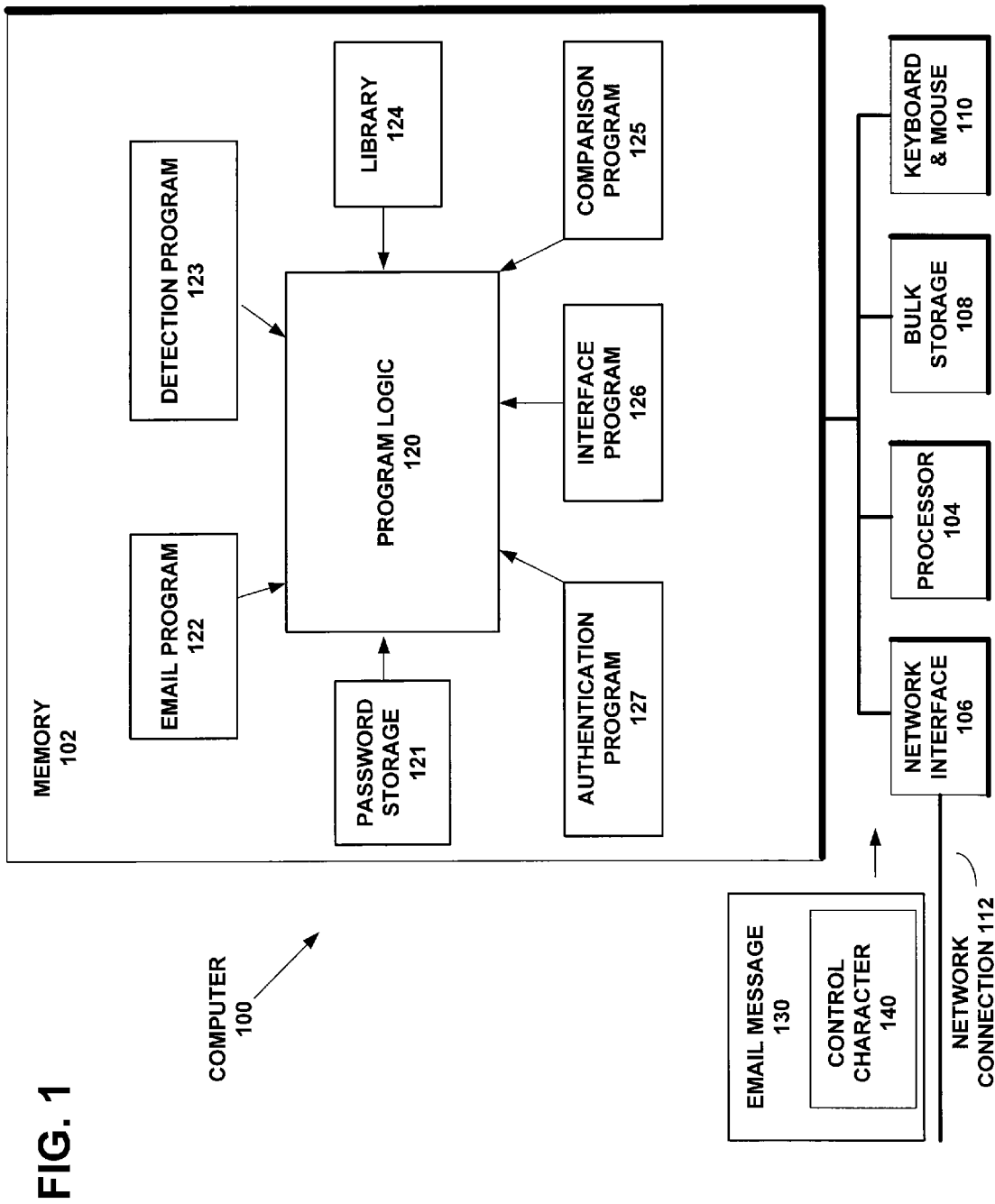
FIG. 1 is an example embodiment of the system.
Figure 2:
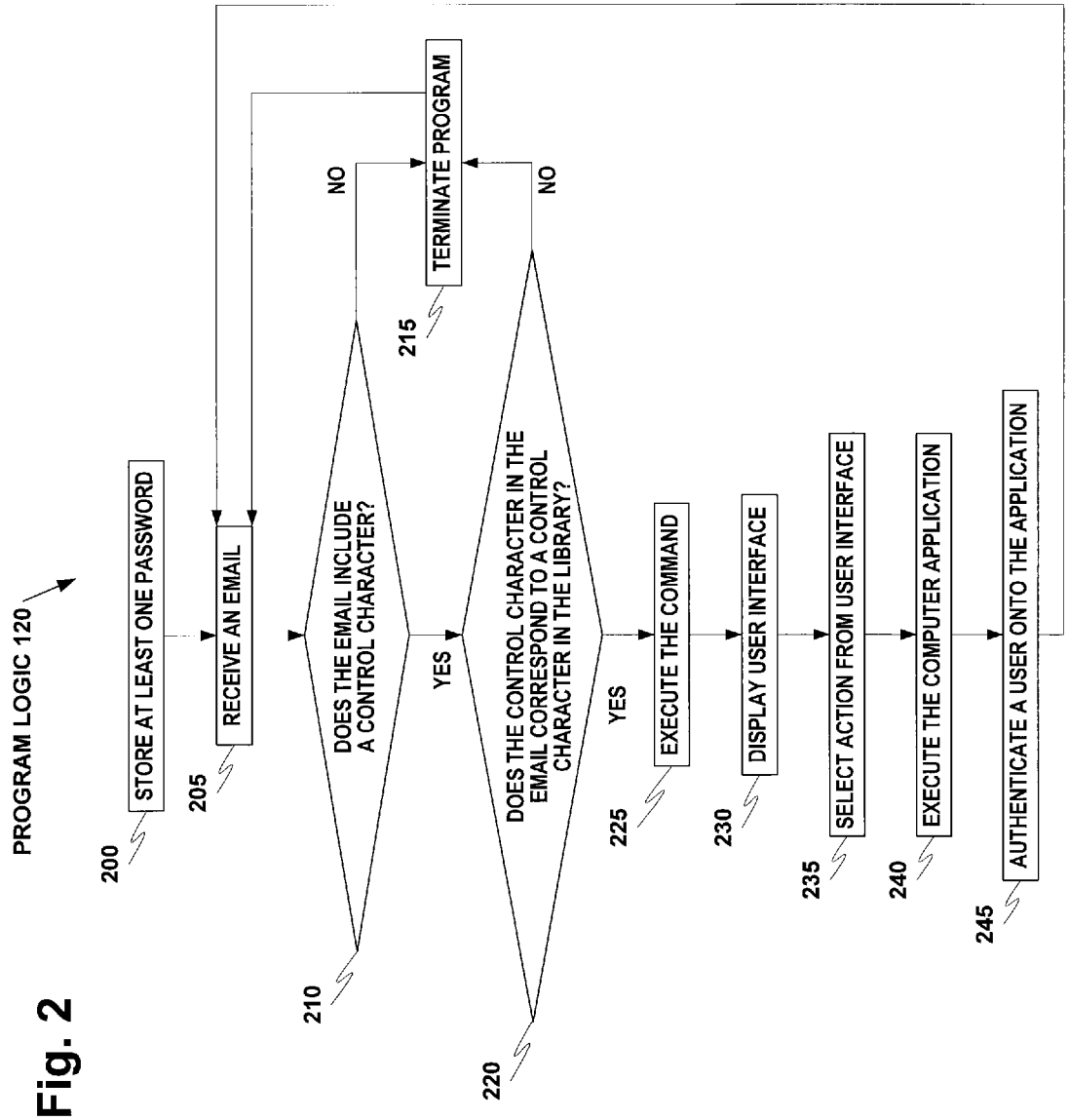
FIG. 2 illustrates a flow chart of a process according to at least one example embodiment.

FIG. 2 is a flow diagram of a program logic 120, which can be embodied as a sequence of computer program instructions stored in the memory 102 of the computer 100 of FIG. 1. The program logic 120 is executed by the processor 104 to carry out the functions of the embodiments.

Referring to FIG. 2, Step 200 discloses storing at least one password. A user may have at least one password to login and access a network, and may also have the same or a different password for each computer application. The password may be stored in the memory 120 of the computer 100, such as in password storage 121, after being entered by the user with the keyboard and mouse 110. In an alternative embodiment, the at least one password may be stored on the network. In order to login the network or a computer application, the user may be prompted to enter a password, the computer may automatically enter the password from the password storage 121 and request confirmation by the user, or the computer may automatically authenticate using a password from the password storage 121.

Step 205 discloses an example of receiving an email message 130. The email message 130 may be received through a network connection 112, such as the internet or an organizational intranet, and a network interface 106 of the computer 100. The computer 100 may organize and process the email message 130 using an email program 122.

Step 210 discloses an example of determining whether an incoming email message 130 includes a control character 140. A control character 140 may be any non-display command that signals to the computer to perform an action. For example, the control character may be a command to execute a specific computer application, such as a computer application that requires a password. In an alternative embodiment, the control character may be a control word or a control phrase. The control character 140 may be an additional field in the email message, metadata, text embedded in the email, or any other form of control character, word, or phrase known to those skilled in the art. A control character may be detected in the email message using a detection program 123, which may include subject matching, text analysis, language processing, or any other filtering or analysis technology known to those skilled in the art.

If a control character 140 is not determined to be included in the email message 130, the program may terminate at Step 215 and revert to Step 205.

If a control character 140 is detected in the email message 130, the control character 140 may then be compared to a library 124 of control characters, which may be stored in the memory 102 of the computer 100. Step 220 discloses an exemplary comparison. The library 124 may include a buffer for each control character associated with the program, wherein each buffer may store a string. A comparison program 125 may compare the email message 130 to each string in the library 124 to determine whether a control character 140 in the email 130 corresponds to a control character in the library 124.

If the control character 140 in the email message 130 does not correspond to a control character in the library 124, then the program may terminate in Step 215 and revert to Step 205.

If the comparison program determines that a control character 140 in the email 130 corresponds to a control character in the library 124, the computer may execute any command that is associated with the control character. By executing the command at Step 225, the computer 100 may then perform the corresponding action at Step 230, such as displaying a user interface that includes at least two user-selectable actions specific to the computer application. The user interface may be a "pop-up" pane in the email program or a user interface in a different window or tab. The user interface may also be a "push button"-type user interface, and may include a "mouse rollover" function. The options presented in the user interface may cause the computer application to be displayed, or may complete the task directly from the email program without displaying the application.

The user may then select an available action from the user interface, as exemplified by Step 235. Such a selection may execute the computer application in Step 240. In addition, the selection may also cause the automatic authentication of a user onto the computer application. Step 245 discloses an exemplary authentication. Using at least one stored password that corresponds to the computer application, the authentication program 126 allows access to the application without the need to re-enter a password for the application. An example of such an authentication program may be Single Sign-On (SSO). The process may then revert to Step 205.

The embodiments and examples described above are not intended to be limiting, and may be embodied in many forms that are not specifically disclosed herein. Changes and modifications are not precluded and may be made within the spirit and scope of the embodiments.

The invention claimed is:

1. A method, comprising:

storing at least one password of a user on a computer;

receiving, in an email program in said computer, an email message for the user from a network;

determining whether said email message includes a control character, said control character specifying a computer application requiring a password;

if said email message includes said control character, comparing said control character to a library of control characters, each of said control characters in said library of control characters corresponding to a command;

if said control character in said email message corresponds to a control character in said library of control characters, executing said corresponding command, wherein said corresponding command displays a user interface in the email program, the user interface including at least two user-selectable actions specific to the computer application;

selecting, by the user, an action from the at least two user-selectable actions specific to the computer application available from the user interface;

executing the computer application in accordance with the selected action; and automatically authenticating the user onto said computer application by matching at least one of the passwords of the user stored on said computer to the password required by said computer application.

* * * * *